US00RE44286E

(19) United States
(12) Reissued Patent
Bell et al.

(10) Patent Number: US RE44,286 E
(45) Date of Reissued Patent: Jun. 11, 2013

(54) COMMUNICATION DEVICE WITH ROTATING HOUSING

(75) Inventors: Gary Bell, San Diego, CA (US); Soren Petersen, Borup (DK)

(73) Assignee: Nokia Corporation

(21) Appl. No.: 12/346,427

(22) Filed: Dec. 30, 2008

Related U.S. Patent Documents

Reissue of:
(64) Patent No.: 7,162,030
Issued: Jan. 9, 2007
Appl. No.: 10/746,054
Filed: Dec. 23, 2003

(51) Int. Cl.
*H04M 9/00* (2006.01)
*H04M 1/00* (2006.01)

(52) U.S. Cl.
USPC ..... 379/433.13; 379/433.02; 379/433.04; 379/433.07; 455/556.1; 455/566

(58) Field of Classification Search
USPC ..... 379/433.13, 433.02; 455/575.1, 455/575.3, 575.4, 566
See application file for complete search history.

(56) References Cited

U.S. PATENT DOCUMENTS

| | | | |
|---|---|---|---|
| 4,547,194 | A | 10/1985 | Moorehead |
| 4,572,186 | A | 2/1986 | Could et al. |
| 4,655,771 | A | 4/1987 | Wallsten |
| 4,732,152 | A | 3/1988 | Wallsten et al. |
| 4,848,343 | A | 7/1989 | Wallsten et al. |
| 4,990,151 | A | 2/1991 | Wallsten |
| 5,026,377 | A | 6/1991 | Burton et al. |
| 5,129,887 | A | 7/1992 | Euteneuer et al. |
| 5,201,757 | A | 4/1993 | Heyn et al. |
| 5,290,248 | A | 3/1994 | Bierman et al. |
| 5,360,401 | A | 11/1994 | Turnland |
| 5,389,087 | A | 2/1995 | Miraki |
| 5,391,172 | A | 2/1995 | Williams et al. |
| 5,409,495 | A | 4/1995 | Osborn |
| 5,458,605 | A | 10/1995 | Klemm |
| 5,458,615 | A | 10/1995 | Klemm et al. |
| 5,484,444 | A | 1/1996 | Braunschweiler et al. |

(Continued)

FOREIGN PATENT DOCUMENTS

| | | | |
|---|---|---|---|
| CN | 1300497 | A | 6/2001 |
| CN | 1442991 | A | 9/2003 |

(Continued)

OTHER PUBLICATIONS

European Search Report dated Dec. 19, 2008 for Application No. EP 04 81 3680.

(Continued)

*Primary Examiner* — Patrick Edouard
*Assistant Examiner* — Julio Perez
(74) *Attorney, Agent, or Firm* — Alston & Bird LLP

(57) ABSTRACT

The present invention encompasses an electronic device that comprising two housings connected via a hinge. The two housing are capable of rotating about one and another. The two housing may be rotated to place the electronic device in an open or closed position. Electronic device further comprises at least two scroll dials, allowing the user to operate various functions in either the closed position or the open position. A display is provided that automatically adjust orientation to allow the user to view the information provided on the display in either open or closed position. The electronic device also provides for adjusting the audio functionalities based on the position of the electronic device.

32 Claims, 8 Drawing Sheets

U.S. PATENT DOCUMENTS

| | | | | |
|---|---|---|---|---|
| 5,507,768 | A | 4/1996 | Lau et al. | |
| 5,533,968 | A | 7/1996 | Muni et al. | |
| 5,534,007 | A | 7/1996 | St. Germain et al. | |
| 5,558,101 | A | 9/1996 | Brooks et al. | |
| 6,466,202 | B1 | 10/2002 | Suso et al. | |
| 6,766,182 | B2 | 7/2004 | Janninck et al. | |
| 6,812,954 | B1 | 11/2004 | Priestman et al. | |
| 7,158,371 | B2 | 1/2007 | Park et al. | |
| 7,187,958 | B2 * | 3/2007 | Nishijima et al. | 455/575.3 |
| 7,555,322 | B2 | 6/2009 | Shimamura et al. | |
| 2003/0203747 | A1 * | 10/2003 | Nagamine | 455/575.3 |
| 2004/0132512 | A1 | 7/2004 | Yajima | |
| 2004/0204012 | A1 * | 10/2004 | Kakinuma | 455/550.1 |

FOREIGN PATENT DOCUMENTS

| | | | |
|---|---|---|---|
| EP | 1 271 897 | A | 1/2003 |
| EP | 1 298 890 | A | 4/2003 |
| GB | 2 338 141 | A | 12/1999 |
| JP | 2003-044199 | A | 2/2003 |
| JP | 2003-134205 | A | 5/2003 |
| JP | 2003-348205 | A | 12/2003 |
| KR | 2002-0059146 | A | 7/2002 |
| KR | 2005-0029597 | A | 3/2005 |

OTHER PUBLICATIONS

Office Action for Japanese Application No. 2006-547082 dated Jan. 15, 2009.

Office Action for Japanese Application No. 2006-547082 dated Nov. 10, 2009.

Mobile Phone New Product Show Case A5305K (formulared), Mobile Phone Watch Editing Department, Japan, May 2003, [online] [retrieved Sep. 11, 2010]. Retrieved from the Internet: <URL: http://k-tai.impress.co.jp/cda/article/showcase_top/14019.html>. 11 pages.

A5305K Manual, au (KDDI), Japan, May 16, 2003, pp. 24 and 30-33. 8 pages.

International Search Report for International Appl. No. PCT/US04/41390, mailed Feb. 8, 2006.

Written Opinion for International Appl. No. PCT/US04/41390, mailed Feb. 8, 2006.

Office Action for Chinese Patent Appl. No. 200480041166.2, dated Apr. 3, 2009.

Office Action for Korean Patent Appl. No. 10-2006-7014813, dated Jun. 26, 2007.

* cited by examiner

COMMUNICATION DEVICE WITH ROTATING HOUSING

Matter enclosed in heavy brackets [ ] appears in the original patent but forms no part of this reissue specification; matter printed in italics indicates the additions made by reissue.

FIELD OF THE INVENTION

The present invention relates to an electronic device having a housing with rotating (pivoting) features, more particularly, to a method and apparatus for adjusting the operation of components based on rotation of the housing.

BACKGROUND OF THE INVENTION

A communication system is operable to communicate information between a transmitting station (a calling party) and a receiving station (a called party) by way of a communication connection. A wireless communication system is a communication system in which information is communicated between the transmitting and receiving stations via one or more base stations. A cellular or digital communication system is exemplary of a multi-user wireless communication system.

Various wireless communication systems have been developed and implemented throughout large geographical areas. Various standards have been established, and the wireless communication systems are generally constructed to be operable in compliance with one or more of the standards. One such standard, referred to as IS-95/IS-2000 defines a CDMA (Code Division Multiple Access) based wireless communication system. In a wireless communication system such as CDMA, defined by IS-95/IS-2000 standard, a call is established between the called party and the calling party when the calling party initiates the call by using a calling sequence. Generally, the calling sequence comprises the user entering a subscriber's address, for example the dialing sequence (also referred to as phone number), of the called party.

In the last few years, the demand for smaller phones has increased. To meet the demand, manufacturers have developed various types of phones, including several flip type phone. However, most flip phones require that the user open the phone to answer an incoming call. In the flip type phones, the user generally has to use two hands to place the phone in an open position. Because of the size, the flip phone generally limits the operable functionalities, for example viewing the caller id of the calling party.

It would be useful if the communication device that was small in size, allowed the user to answer an incoming call without opening the phone, easy to phone and provided more operable functionalities.

SUMMARY OF THE INVENTION

The present invention advantageously provides an apparatus and an associated method, for an electronic device that is small in size, allows the user to place a call and answer an incoming call without opening the phone, it is easy to phone, and provides more operable functionalities.

The present invention encompasses an electronic device, such as a mobile terminal, a personal digital assistant (PDA) or a computer, which may be operated in a communication system (for example CDMA, TDMA, GSM, etc.). The electronic device comprises two housings connected via hinge.

The two housing are capable of rotating about one and another. The two housing may be rotated to place the electronic device in an open or closed position. Electronic device further comprises at least two scroll dials, allowing the user to operate various functions in either the closed position or the open position. A display is provided that automatically adjusts the orientation to allow the user to view the information provided on display in either open or closed position. The electronic device according to invention also provides for adjusting the audio functionalities based on open or closed position of the electronic device. The electronic device also provides a hinge having a cam and locking functionalities to allow the user to open the electronic device with just use of their thumb or their finger.

A more complete appreciation of all the advantages and scope of the present invention can be obtained from the accompanying drawings, the following detailed description of the invention, and the appended claims.

DETAILED DESCRIPTION OF THE INVENTION

Figure 1:
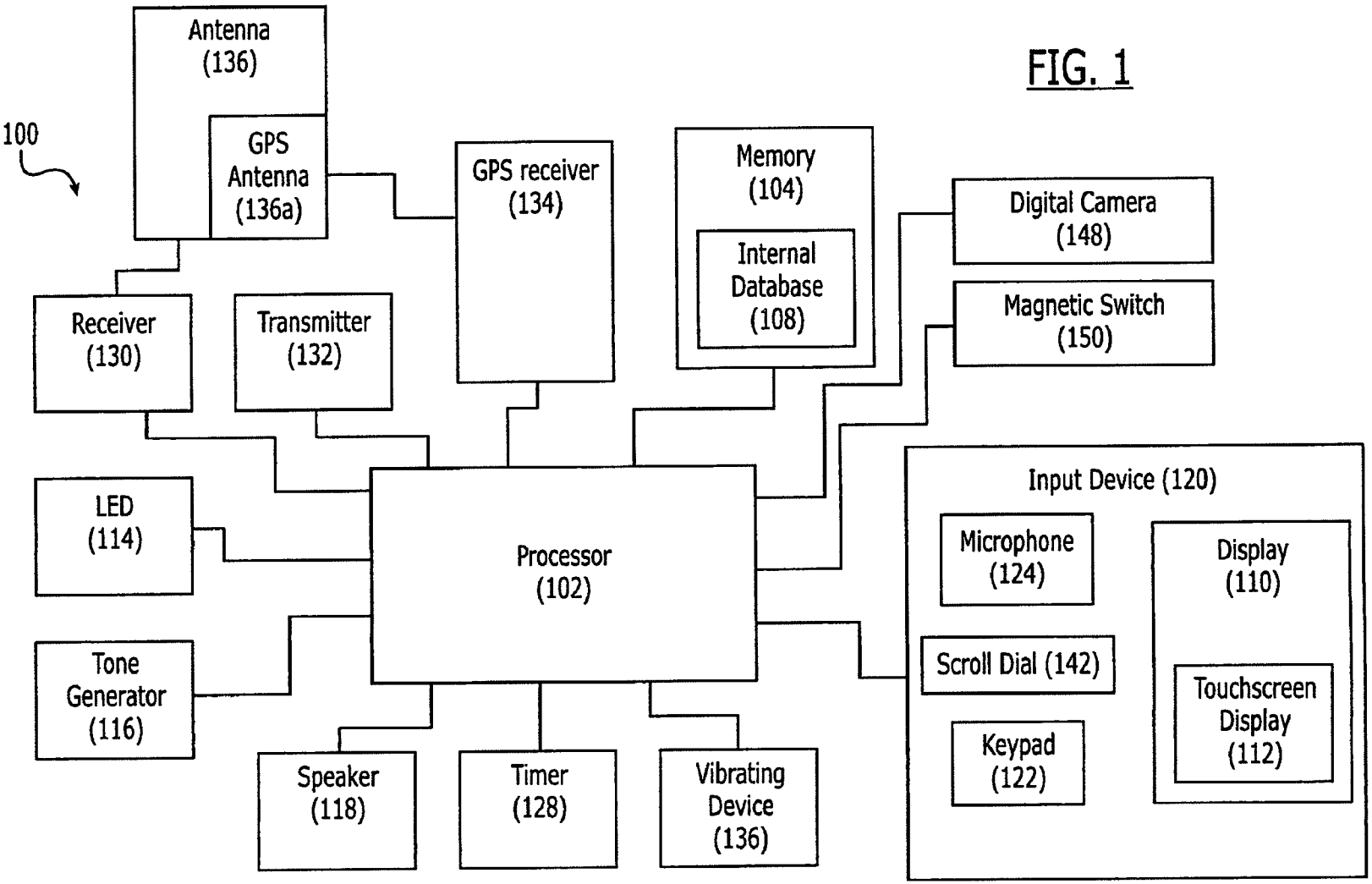
FIG. 1 illustrates a block diagram of a mobile terminal into which an embodiment of the invention may be implemented.

FIG. 1 is a block diagram of the electronic device, such as a mobile terminal 100, according to an embodiment of the invention. Generally, the mobile terminal 100 includes a controller 102 (which may also be known as a processor 102) coupled to various memories, collectively shown as memory 104. Memory 104 includes a plurality of stored constants and variables that are used by processor 102 during the operation of the electronic device 100. For example, memory 104 stores the values of the various feature parameters and the Number Assignment Module (NAM). The memory 104 also comprises an internal database 108, for storing necessary parameters for carrying out the invention. An operating program for controlling the operation of processor 102 is also stored in memory 104 (typically in a read only memory). Memory 104 is also used to store data provided by the user through the user interface. Furthermore, memory 104 is used to hold the subprograms or sub-processes for controlling the operation of mobile terminal 100 and carrying out the embodiment of the invention. The operating program in memory 104 includes routines for adjusting the operations of functionalities based on the position of the electronic device 100.

The user interface of the mobile terminal 100 also includes a Liquid Crystal Display (LCD) 110, a touch-screen display 112, Light Emitting Diode (LED) 114, tone generator 116, speaker 118 and user input device 120, comprising alphanumeric keypad 122, all of which are coupled to processor 102. The input device 120 may also comprise microphone 124, for generating input, and the touch screen display 112. The input device may also comprise a scroll dial feature 142 and may comprise a camera feature 148. Mobile terminal 100 also comprises timer 128 (also referred to as a clock chip) coupled to processor 102 for synchronizing the operations of processor 102 and tracking time.

The exemplary mobile terminal 100 also includes a receiver 130 coupled to an antenna 136 for receiving incoming signals, and a transmitter 132 for transmitting outgoing signals, both are coupled to the processor 102. The processor 102, coupled to the transmitter 132 and the receiver 130, initiates the transmission of outgoing signals and processes incoming signals, respectively. These signals may include signaling information in accordance with the air interface of the applicable cellular or digital system and also user speech and/or user generated data. The outgoing signals may be used to request data from external databases and the incoming signals may include requested data.

In an embodiment, the mobile terminal 100 comprises a Global Positioning System (GPS) receiver 134 for receiving GPS signals from one or more navigational satellites. The GPS receiver 134 is coupled to the processor 102, the processor 102 for processing GPS signals to calculate the location of the mobile terminal 100. The GPS signals are transmitted to the surface by orbiting GPS satellites (preferably three or more) that are picked up by a GPS antenna 136a, which may be integrated into the antenna 136. The GPS receiver 134 converts the GPS signals received from the GPS orbiting satellites into the spatial coordinates of the current receiver location. The spatial coordinates may be defined by the four coordinates x, y, z and t, with x, y, z being the three dimensional spatial point and t being the time at which the x, y, z spatial reference occurs. By simple geometry, for example triangulation, the location of the mobile terminal 100 having a GPS receiver 134 can be calculated. The use of triangulation to determine position is well known and one of ordinary skill in the art will recognize that use of GPS signals will produce a very accurate fix on the GPS receiver's 134 location. Using the spatial coordinates determined from base stations or GPS satellites and using well-known triangulation techniques the processor 102 is able to generate the location (or position) of the mobile terminal 100.

Figure 2B:
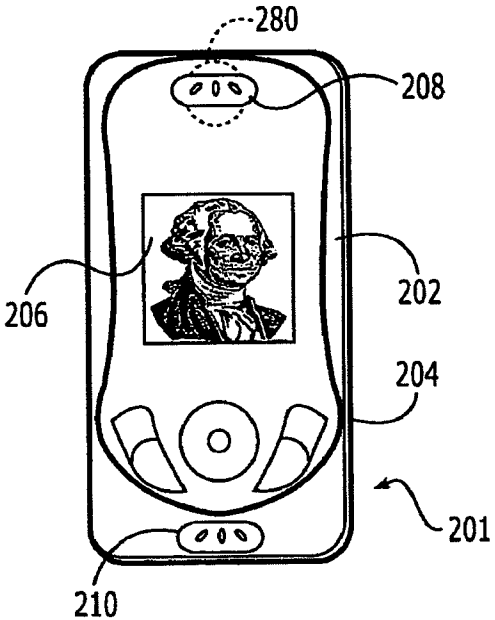
FIG. 2B shows an exemplary emobiment electronic device in closed and closed position.
Figure 2A:
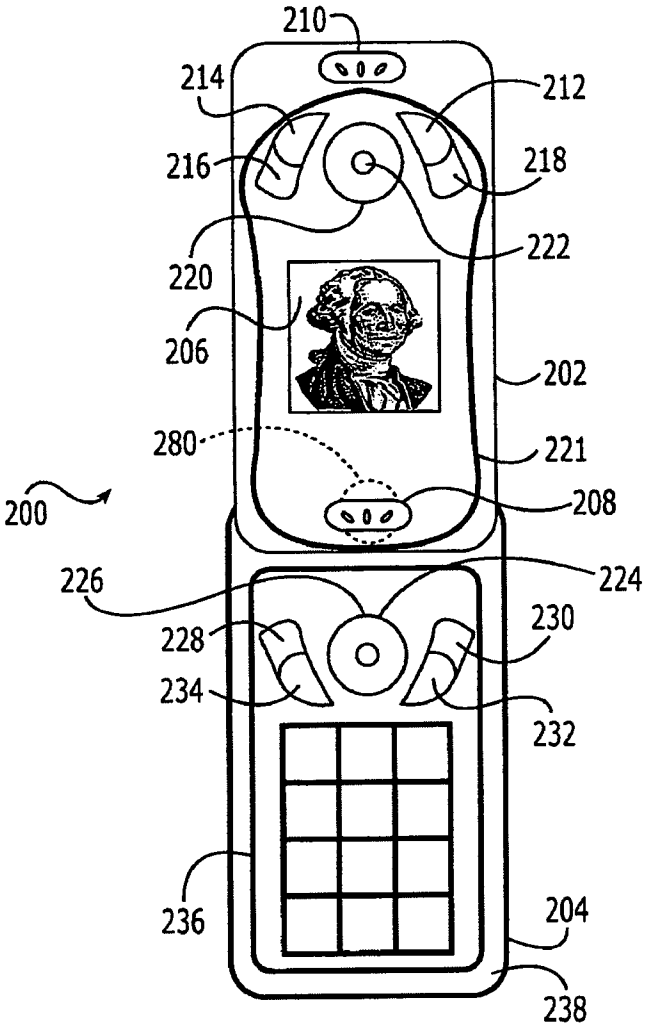
FIG. 2A shows an exemplary emobiment of electronic device in open and closed position.

FIGS. 2A and 2B shows an exemplary implementation of an oval shaped mobile phone 200, analogous to the mobile terminal 100. FIG. 2A show the mobile phone 200 in an open position and FIG. 2B shows the mobile phone 200 in a closed position. The mobile phone 200 according to an aspect of the invention is made of two housing, top housing 202 and bottom housing 204. All the components of mobile terminal 100 as discussed in the FIG. 1 are incorporated within the two housing. According to the preferred embodiment, the top housing 202 and bottom housing 204 are of oval shape and the size of the bottom housing 204 slightly larger than the size of top housing 202.

The top housing 202 is connected to the bottom housing 204 via a hinge 280, such that top housing 202 is able to rotate 180 degree about the hinge 280 from a locked status and relocks upon rotating 180 degrees. For example, when the mobile phone 200 is in the closed position, as shown in FIG. 2B, the hinge 280 locks the mobile phone 200 in that position. In the preferred embodiment, the hinge 280 allows the top housing to rotate both (either right or left) direction. Upon applying pressure, the user can rotate the top housing 180 degrees, in either direction, to open the mobile phone 200. In an operation, this action may answer an incoming call without actuating any keys. Also, when the mobile phone 200 is in the open position, as shown in FIG. 2A, the hinge 280 locks the mobile phone 200 in that position. Upon applying pressure, the user can rotate the top housing 180 degrees, in either direction, to close the mobile phone 200.

In the preferred embodiment, the pressure needed to unlock the top housing 202, while the mobile phone 200 is in closed position, can be applied by simple use of the thumb in either direction. The mobile phone 200 may also be opened or closed using various other techniques, however, use of the thumb is sufficient to open the mobile phone 200. Also, in preferred embodiment, the hinge 280 (also a hinge assembly) comprises a cam and spring action feature. The cam and spring action feature will allow the user to rotate the top housing 202 only few degrees, generally less then 40 degrees, before the cam and spring action feature automatically opens and locks the mobile phone 200 in the open position. Transitioning from opened to closed position, in either direction, the user can rotate the top housing 202 between 130 to 140 degree before the cam and spring action feature automatically closes and locks the mobile phone 200 in the closed position.

In the exemplary mobile phone 200, the top housing 202 comprises a first audio source and the second audio source, 208 and 210, respectively. The first and second audio source 208 and 210, each comprise a speaker functionality for providing audio and a microphone functionality for receiving audio. Both audio sources are integrated in the top housing 202. The top housing 202 comprises user interface devices such as an answering key 212 for answering incoming call or placing a call, an end key 214 for terminating any menu functions and ending a call, first set of info keys 216 and 218 for navigating options during a menu search function, a display 206 for displaying images and information to the user, and a first scroll dial 220, having a dimple 222, for navigation through the user interface features of the mobile phone 200. A chrome plated oval ring 221 is provided to enclose the input devices on the top housing 202.

In the exemplary mobile phone 200, the bottom housing 204 is connected to the top housing 202 via the hinge 280. The bottom housing 204 contains the processor 102, memory 104, receiver 130 and transmitter 132. Other components, as shown in FIG. 1, can be contained in either in the top housing 202 or the bottom housing 204, preferably majority of the components are contained in the bottom housing 204. The bottom housing as shown in FIG. 2A, comprises several input devices, the input devices comprising a telephone keypad 236 having standard numeric keys, an answering key 232 for answering incoming call or initiating a call, an end key 234 for terminating any menu functions and/or ending a call, second set of info keys 228 and 230 for navigating options during a menu search function, and a second scroll dial 224, having a dimple 226, for navigation through the user interface features of the mobile phone 200 while the mobile phone 200 is open position. A chrome plated oval ring 221 is provided to enclose the input devices on the top housing 202.

Figure 3A:
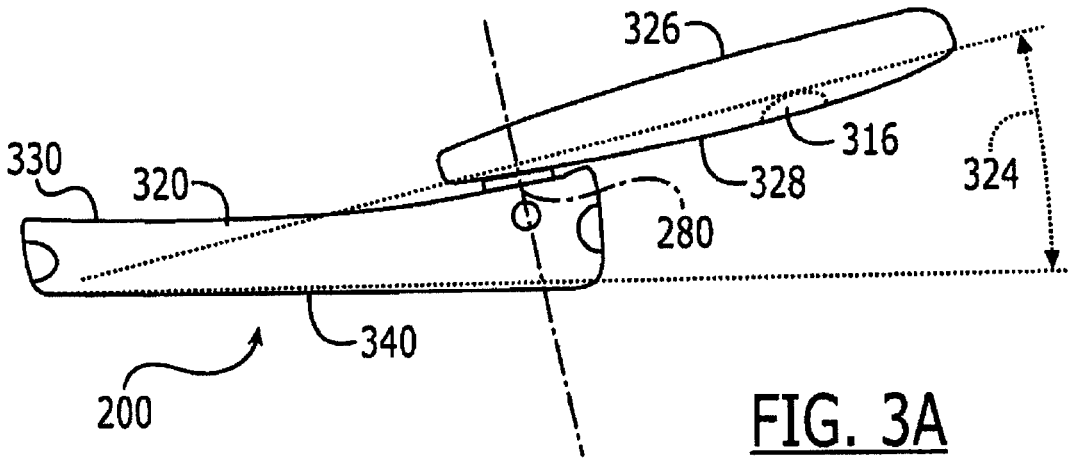
FIG. 3A shows a side view of an exemplary emobiment electronic device in a open position.
Figure 3B:
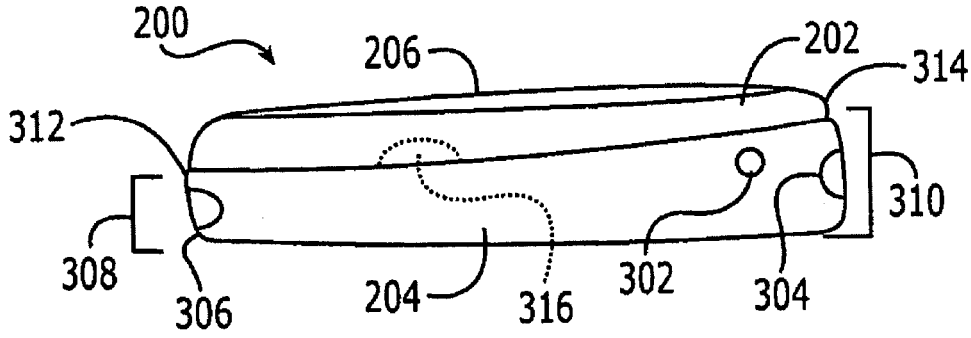
FIG. 3B shows a side view of an exemplary emobiment electronic device in a closed position.

Turning now to FIGS. 3A-3B, a side view of the mobile phone 200 according to the present invention is shown. FIG. 3A shows a side view of the mobile phone 200 in an open position. According to an preferred embodiment of the invention, the bottom housing 204, having a top side 330 and a bottom side 340, wherein the top side 330 of the bottom housing 204 is slightly concaved 320 for easy gliding of the thumb of the user. The top housing 202, having a top side 326 and a bottom side 328, wherein the bottom side 328 of the top housing is slightly convex, matching the bottom housing 204. A digital camera slot 316 is provided in the top housing 202 for incorporating a camera (not shown). In the preferred embodiment, the top housing 202 is smaller than the bottom housing 204. The hinge 280 is incorporated in such a manner that when the mobile phone 200 is an open position, the top housing 202 is extended outward creating a plane 322 and the bottom housing 204 creating a plane 326. The planes 322 and 326 are not parallel to each other when the mobile phone 200 is in open position. When the mobile phone 200 is in an open position, an angle 324 is created between the top housing 202 and the bottom housing 204. The angle 324 is the angle of intersection between plane 322 and plane 326. The angle 324 is generally is less then 45 degrees. According to the preferred embodiment, angle 324 is within a range of 20-40 degrees. This angle 324 provides the user the ability to hold phone in a comfortable position during a call and provides better viewing capability of display 206 while holding the mobile phone 200 in front or taking a picture.

FIG. 3B shows a side view of the mobile phone 200 in a closed position. According to a implementation of the invention, the bottom housing 204 comprises an accessory connector 306 at the lower portion 308 of the bottom housing 204. The bottom housing 204 further comprises an infrared reader and a power switch on the upper portion 310 of the bottom housing 204. A hands free receptor is places generally about the upper portion 310 of the bottom housing 204. In the preferred embodiment, the power source (not shown) that provides power for the mobile phone 200 is incorporated within the bottom housing 204.

Figure 4A:
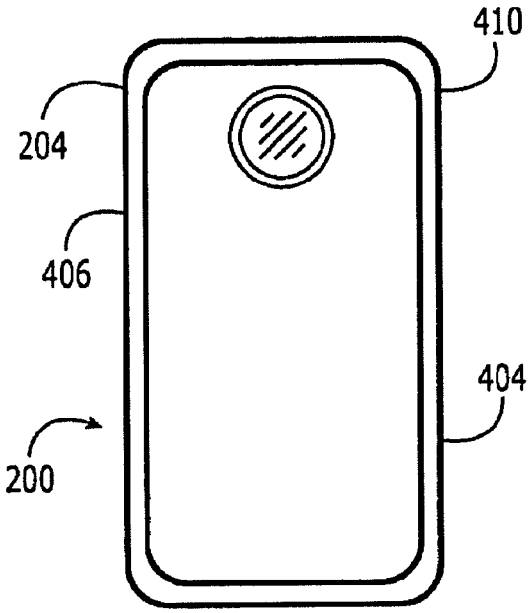
FIG. 4A shows a back view of an exemplary emobiment electronic device in a open position.
Figure 4B:
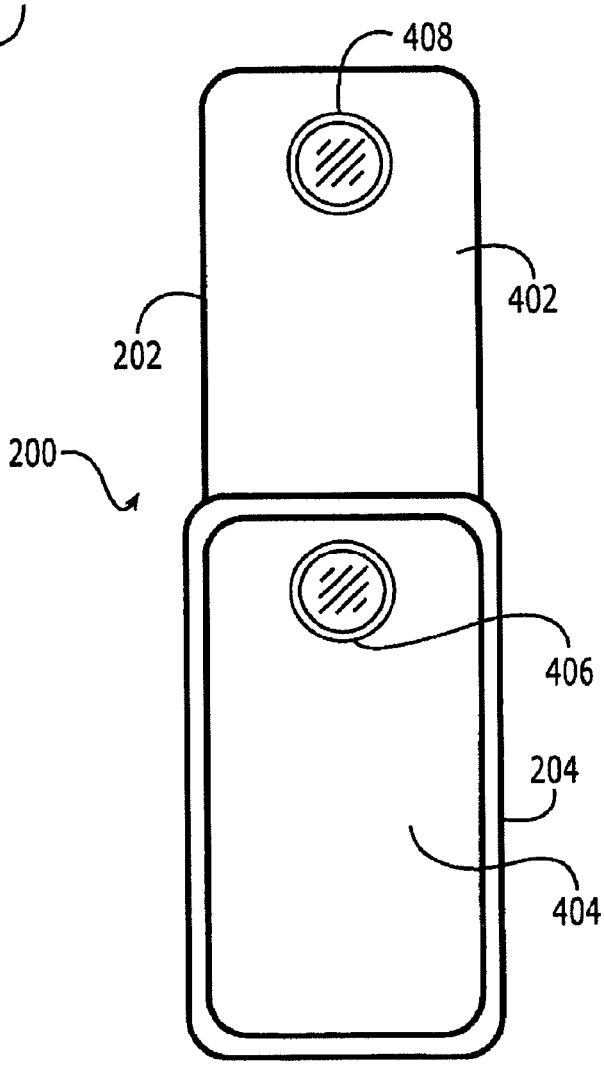
FIG. 4BA shows a back view of an exemplary emobiment electronic device in a open position.

FIG. 4A and FIG. 4B shows the back view of the mobile phone 200 in an open position and in a closed position, respectively. A first digital camera 408 analogous to digital camera 148 is provided on the bottom side of the top housing 202. The first digital camera 408 is exposed and operational when the mobile phone 200 is in an open position. In an alternate embodiment of the invention, a second digital camera 406 analogous to digital camera 148 may be provided. The bottom housing comprises a flat area 404, which is provided on the bottom side 340 of the bottom housing 204, wherein the second digital camera 406 is integrated. Alternatively, only the second digital camera 406 may be provided on the bottom side of the bottom housing, without departing from the invention.

Figure 5A:
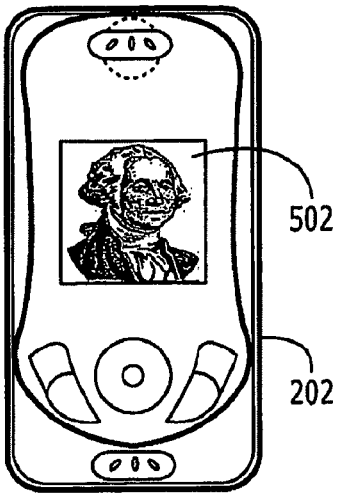
FIG. 5A-5D shows different orientations of the exemplary embodiment of the electronic device.
Figure 5B:
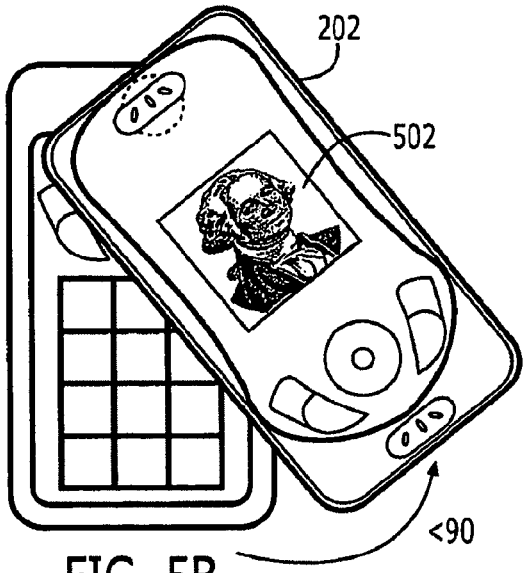
Figure 5C:
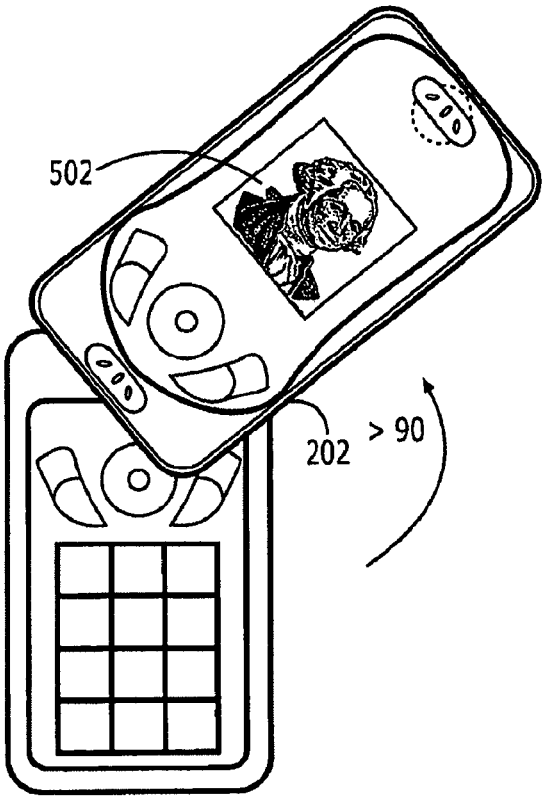
Figure 5D:
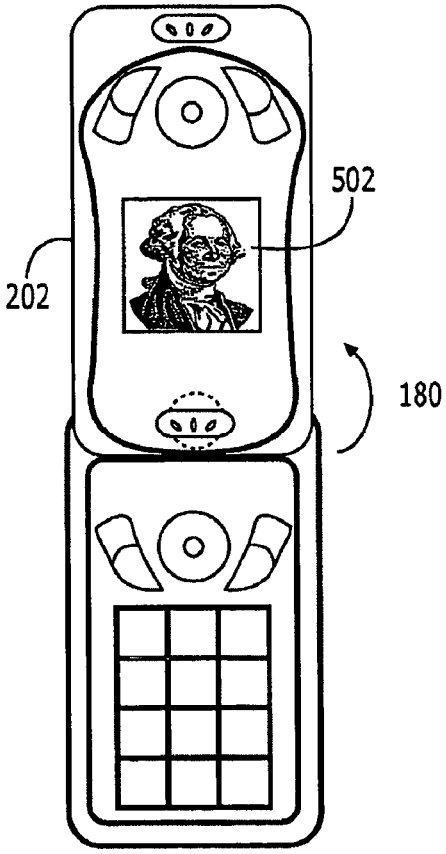

Turning now to FIG. 5A-5D, diagrams the different orientation of the top housing 204 of the mobile phone 200. With reference to FIG. 5A, the mobile phone 200 is in the closed position containing an image 502. In FIG. 5B, the top housing has been rotated less than 90 degrees and in FIG. 5C, the top housing has been rotated more than 90 degrees. According to the preferred embodiment, the orientation of the image 502 would switched once the top housing 202 has been rotated more than 90 degrees. This can be achieved by using magnetic switch 150 that can toggle upon sliding over a magnet. The switch 150 is preferably connected to the processor 102 wherein the process rotates the orientation of display, for example flipping the image 180 degrees, when the switch 150 is actuated. The switch 150 is activated upon the top housing 202 rotating more than 90 degrees about the bottom housing 204. The placement of the switch is dependent on the manufacturer, as long as some detection is made that the top housing 202 has been rotated more than 90 degrees. According to the preferred embodiment, a magnetic switch 150 is placed near the speaker of audio source 208, since using the speaker magnets would avoid having to add extra components. It should be noted that several other techniques might be used without departing from the spirit of the invention. In FIG. 5D, the top housing has been rotated 180 degrees resulting in the image 502 being rotated 180 degrees from FIG. 5A.

Figure 6:
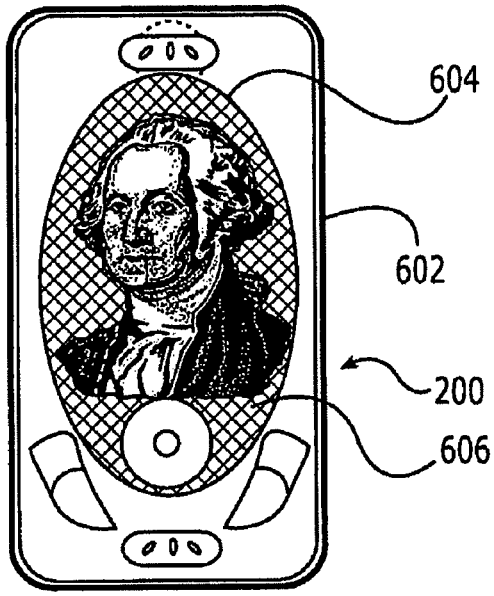
FIG. 6 shows an alternate emobiment of he electronic device.

FIG. 6 illustrates a mobile phone 200 according to alternate embodiment of the invention, wherein the mobile phone 200 comprises an oval shaped area 604 for displaying an image 606. In this embodiment, the most of the area 604 is used for displaying.

Figure 7:
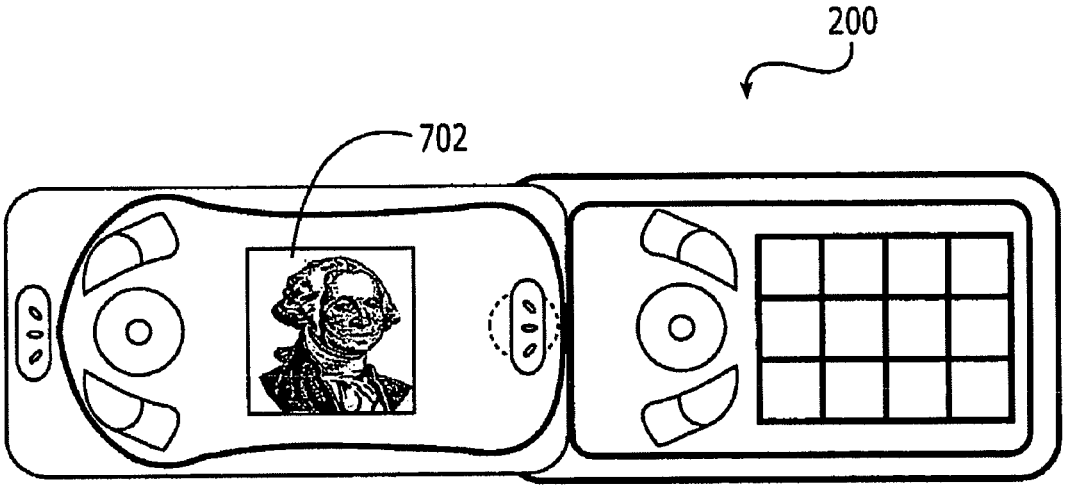
FIG. 7 shows an alternate emobiment of he electronic device.

FIG. 7 illustrates another embodiment of the mobile phone 200 according to an aspect of the invention. Accordingly, while the mobile phone 200 is in an open position, the opened mobile phone 200 may be rotated 90 degrees as shown in FIG. 7. This would allow user to use both hands to operate the mobile phone 200. Upon actuation of the predetermined set of keys, the image 702 is aligned such that the user is able to view the image a portrait mode, in other words upright. Also, some components may also become active that were inactivated prior to rotation of the mobile phone 200. Actuation of the same predetermined keys may place the mobile phone 200 in a open position state.

Figure 8:
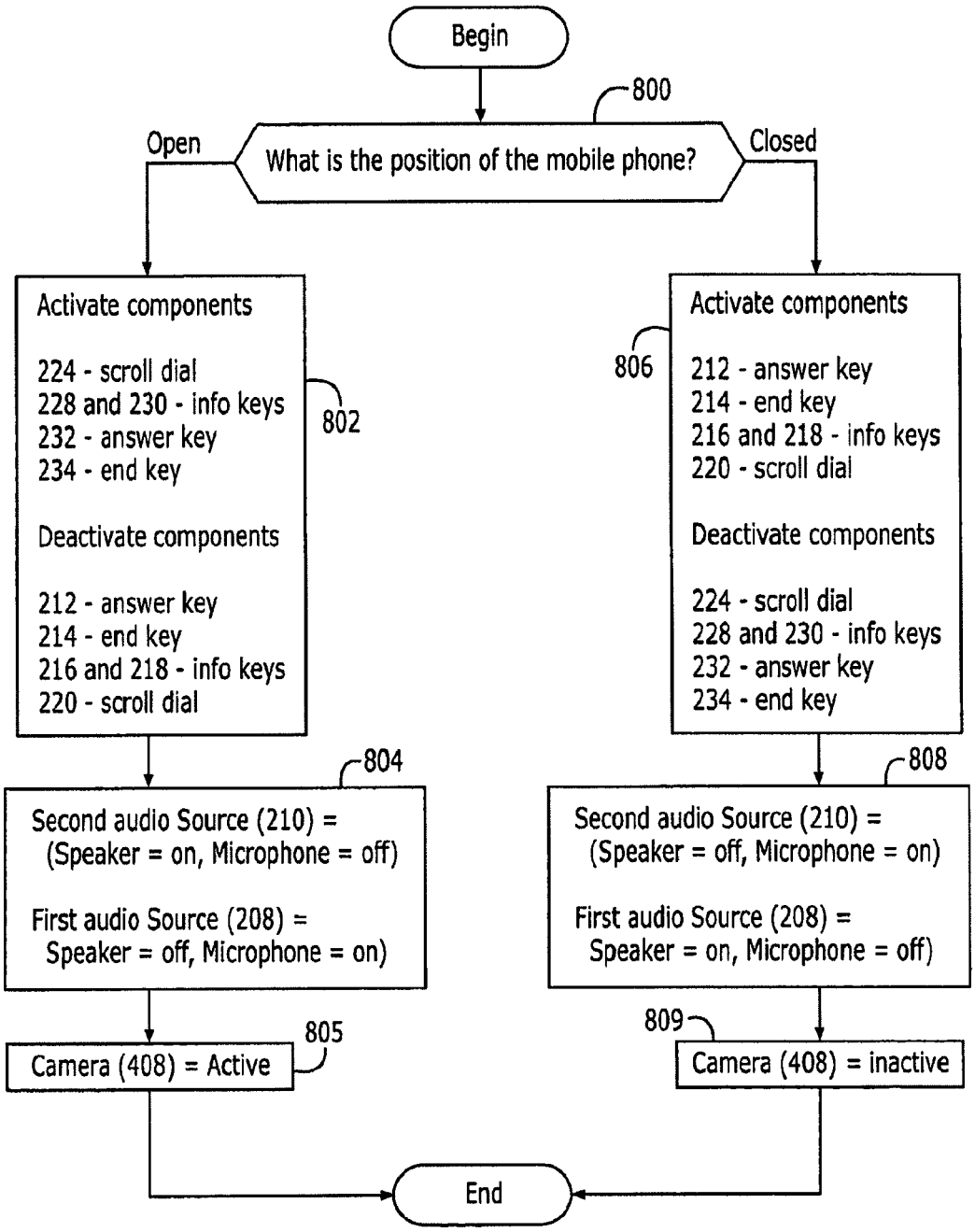
FIG. 8 shows a process flowchart a software module depiction of an embodiment of the invention.

FIG. 8 illustrates an exemplary flowchart of the process, controlled by the processor 102, for adjusting the functionalities of mobile phone 200 components according to the present invention. Under this process, when the processor 102 detects a rotation of the top housing 202, at block 800, if the processor 102 determines that the mobile phone 200 is in open position, then the processor 102 executes block 802. At block 802, some of the components of the [top] *bottom* housing [202] *204* (the second scroll dial 224, info keys 228 and 230, the answer key 232, and the end key 234) are activated and some of the components of the [bottom] *top* housing [204] *202* (the answer key 212, the end key 214, info keys 216 and 218, the first scroll dial 220) are deactivated. At block 804, the speaker functionality of the second audio source 210 is set to active and the microphone functionality of the second audio source 210 is set to inactive. Concurrently, microphone functionality of the first audio source 208 is set to active and the speaker functionality of the first audio source 208 is set to inactive. At block 805, the first camera 408 is set to active.

Referring back to block 800, if the processor 102 determines that the mobile phone 200 is in closed position, then the processor 102 executes block 806. At block 806, some of the components of the [bottom] *top* housing [204] *202* (the answer key 212, the end key 214, info keys 216 and 218, the first scroll dial 220) are activated and some of the components of the [top] *bottom* housing [202] *204* (the second scroll dial 224, info keys 228 and 230, the answer key 232, and the end key 234) are deactivated. At block 808, the speaker functionality of the second audio source 210 is set to inactive and the microphone functionality of the second audio source 210 is set to active. Concurrently, microphone functionality of the first audio source 208 is set to inactive and the speaker functionality of the first audio source 208 is set to active. At block 809, the first camera 408 is set to active.

Figure 9:
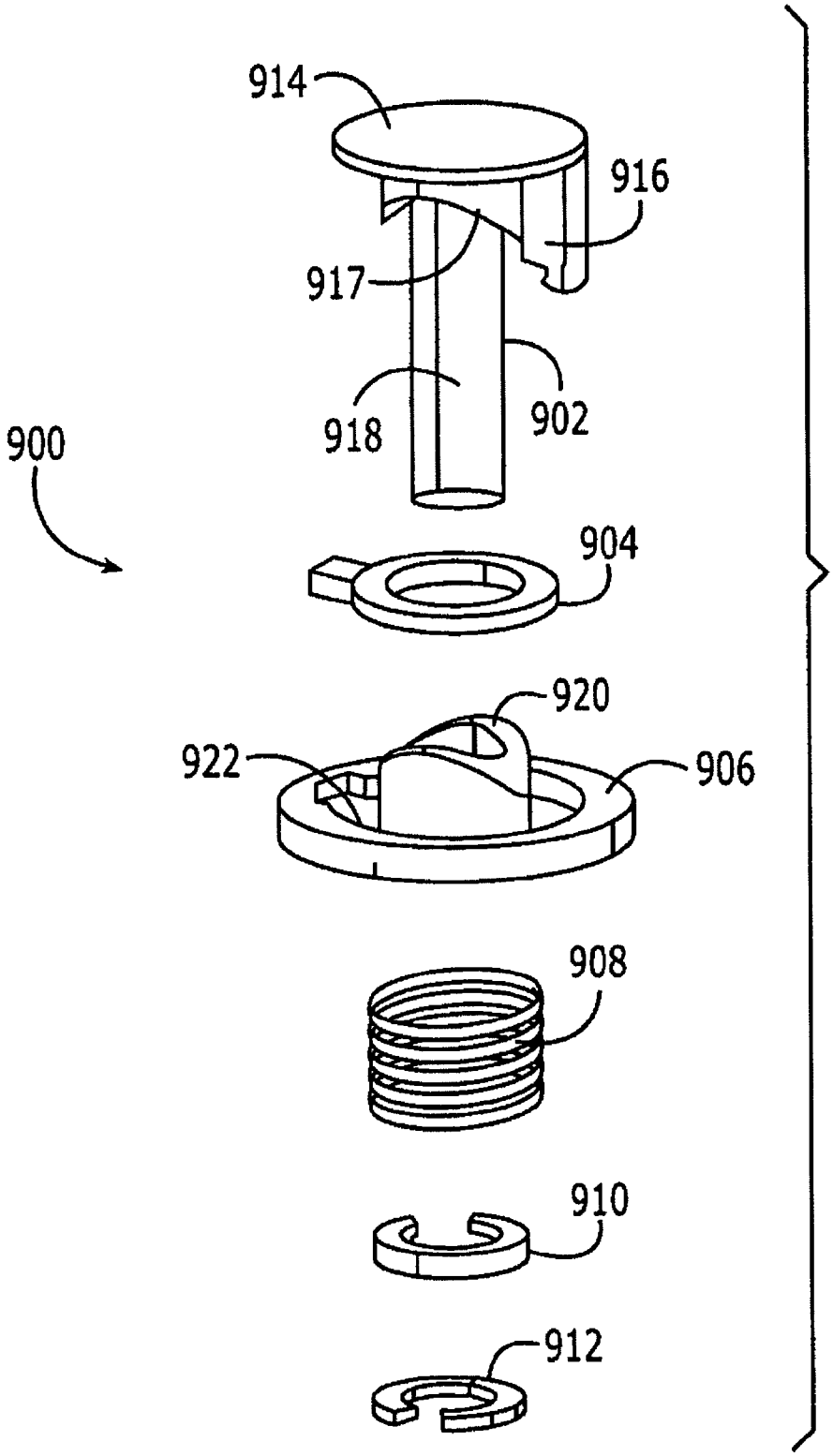
FIG. 9 shows an exploded view of an exemplary hinge assembly.

FIG. 9 illustrates exploded view of an exemplary embodiment of the hinge assembly for opening and closing the electronic device. The hinge assembly 900 comprises a pivot top piece 902, a shuttle 904, a bottom pivot 906, a spring 908, a washer 910 and snap ring 912. The top pivot piece 902 having a pivot top 914, which is attached to the top housing 202, and has pivot stop 916 and a mating cam securing section 917 extended therein. The top pivot piece 902 further comprises a pivot shaft 918 that is extended from the pivot top 914 through the mating cam securing section 917. The bottom pivot 906 comprises a carrier section 922 for receiving the shuttle 904.

The bottom pivot 906 further comprises a mating cam 920. The hinge assembly 900 is assemble such that the shuttle 906 is placed in the carrier section 922 of the bottom pivot 904 through the matting cam 920. The shuttle 906 is secured inside the carrier 922 by sliding the pivot shaft 918 through the mating cam 920, such that the matting cam is flush against the matting cam securing section 917. The spring 908, the washer 910 and the snap ring 912 are then slide on the pivot shaft 918 such that the matting cam 920 is flush against the matting cam securing section 917. It should be noted that various hinge assembly may used to achieve the cam and spring action feature without departing from the invention.

As examples, the method and apparatus may also be implemented in electronic devices such as regular PDA, PDA with wireless communication capabilities, general-purpose computers, and devices having a wireless connection or landline connection methods. The method and apparatus may be realized by implementing an operating mode, which may be modified by the user using a menu feature.

Thus, while the invention has been particularly shown and described with respect to preferred embodiments thereof, the above description is intended by way of example only and is not intended to limit the present invention in any way except as set forth in the following claims.

What is claimed is:

[1. An electronic device operable in a wireless communication system having an open position and closed position, the electronic device comprising:

a first housing, said first housing having a first scroll dial, a display, a first audio source and a second audio source; said display for displaying information to the user and said display comprising a plurality of orientations for displaying information;

a second housing, said second housing having a second scroll dial, and a keypad;

a hinge for connecting said first housing to the second housing, said hinge allowing the first housing to rotate to place the electronic device in an open position, the first housing being rotatable about an axis directed out of a plane defined by a surface of the display; said hinge further having a cam feature and a locking feature; and a processor for determining position of the electronic device and said processor for controlling functionalities of the electronic device, said first audio source and second audio source based the position of the electronic device.]

[2. The electronic device as claimed in claim 1, wherein said first housing further comprising a first answer key, a first end key and a plurality of first info keys;

said second housing further comprising a second answer key, a end key and a plurality of second info keys;

said first audio source comprises a first microphone and first speaker; and said second audio source comprises a second microphone and second speaker.]

[3. The electronic device as claimed in claim 2, wherein said processor for deactivating said first answer key, said first end key, said plurality of first info keys, said first microphone and said second speaker if determined that the electronic device is in a open position; and said processor for activating said second answer key, said second end key, said plurality of second info keys, said second microphone and said first speaker if determined that the electronic device is in a open position.]

[4. The electronic device as claimed in claim 2, wherein said processor for deactivating said second answer key, said second end key, said plurality of second info key, said second microphone and said first speaker if determined that the electronic device is in a closed position; and said processor for activating said first answer key, said first end key, said plurality of first info keys, said first microphone and said second speaker if determined that the electronic device is in a closed position.]

[5. The electronic device as claimed in claim 1, wherein said first housing further comprising a first camera; and said processor for deactivating first camera if determined that the electronic device is in a closed position.]

[6. The electronic device as claimed in claim 1, wherein said second housing further comprising a second camera.]

[7. The electronic device as claimed in claim 1, wherein display having a first orientation wherein the first orientation is provided when the electronic device is in a closed position.]

[8. The electronic device as claimed in claim 1, wherein display having a second orientation wherein the second orientation is provided when the electronic device is in an open position.]

[9. The electronic device as claimed in claim 1, further comprising a switch connected to said processor wherein said processor rotating said orientation of said display upon actuation of said switch.]

[10. The electronic device as claimed in claim 9, wherein said switch comprises a magnetic switch and said magnetic switch is actuated upon said first housing rotating more than 90 degrees about said second housing.]

[11. The electronic device as claimed in claim 1, wherein said display comprises a first orientation and a second orientation for displaying information to the user, wherein the information is displayed for said first orientation is 180 degrees opposite of the said second orientation.]

[12. The electronic device as claimed in claim 11, wherein said first housing is on top of said second housing such that when the electronic device is in a closed position, said first housing covers said keypad of said second housing and said display displays information using said first orientation.]

[13. The electronic device as claimed in claim 11, wherein said first housing is on top of said second housing such that when the electronic device is in a open position, said first housing exposes said keypad of said second housing and said display displays information using said second orientation.]

[14. An electronic device operable in a wireless communication system having an open position and closed position, the electronic device comprising:

a first housing, said first housing comprising a first scroll dial, a display, a first audio source and a second audio source; said display for displaying information to the user and said display having a plurality of orientations;

a second housing, said second housing having a second scroll dial, and a keypad;

a hinge for connecting said first housing to the second housing, said hinge allowing the first housing to rotate 180 degree in either direction about said second housing to place the electronic device in an open position, the first housing being rotatable about an axis directed out a plane defined by a surface of the display;

a processor for determining position of the electronic device and said processor for controlling functionalities of the electronic device upon determining the position of the electronic device; said processor adjusting the functionalities of said first audio source and second audio source based on the position of the electronic device; and a switch connected to said processor and said processor rotating said orientation of said display upon actuation of said switch.]

[15. The electronic device as claimed in claim 14, wherein said switch comprises a magnetic switch and said magnetic switch is actuated upon said first housing rotating more than 90 degrees about said second housing.]

[16. The electronic device as claimed in claim 14, wherein said first housing further comprising a first camera; and said processor for deactivating first camera if determined that the electronic device is in a closed position.]

[17. The electronic device as claimed in claim 14, wherein said second housing further comprising a second camera.]

[18. The electronic device as claimed in claim 14, wherein display having a first orientation wherein the first orientation is provided when the electronic device is in a closed position.]

[19. The electronic device as claimed in claim 14, wherein display having a second orientation wherein the second orientation is provided when the electronic device is in an open position.]

[20. The electronic device as claimed in claim 14, further comprising a switch connected to said processor wherein said processor rotating said orientation of said display upon actuation of said switch.]

[21. The electronic device as claimed in claim 14, wherein said display comprises a first orientation and a second orientation for displaying information to the user, wherein the information is displayed for said first orientation is 180 degrees opposite of the said second orientation.]

[22. The electronic device as claimed in claim 21, wherein said first housing is on top of said second housing such that when the electronic device is in a closed position, said first housing covers said keypad of said second housing and said display displays information using said first orientation.]

[23. The electronic device as claimed in claim 21, wherein said first housing is on top of said second housing such that when the electronic device is in a open position, said first housing exposes said keypad of said second housing and said display displays information using said second orientation.]

[24. A method of controlling functionalities of an electronic device having a first housing and a second housing wherein said first housing rotatable about the second housing, the method comprising acts of:

determining if switch that provides an indication of rotation of the first housing about the second housing was actuated;

switching the orientation of image displayed on a display if determined that a switch is actuated;

determining if the electronic device is in a closed position;

adjusting functionalities of at least one audio source if determined that the electronic device is said closed position; and disabling functionality of a first scroll dial if determined that the electronic device is in a open position.]

[25. The method as claimed in claim 24, further comprises an act of determining if the electronic device is said open position and adjusting the functionalities of at least one audio source if determined that the electronic device is said open position.]

[26. The method as claimed in claim 24, the method further comprises an act of adjusting functionalities of a first audio source if determined that the electronic device is said closed position.]

[27. The method as claimed in claim 24, the method further comprises an act of adjusting functionalities of a second audio source if determined that the electronic device is said closed position.]

[28. The method as claimed in claim 24, wherein the step of adjusting functionalities comprises a step of disabling a speaker of a second audio source and enabling a microphone of said second audio source.]

[29. The method as claimed in claim 24, wherein the step of adjusting functionalities comprises a step of disabling a microphone of a first audio source and enabling a speaker of said first audio source.]

*30. An electronic device operable in a wireless communication system having an open position and closed position, the electronic device comprising:*

*a first housing, said first housing having a first scroll dial, a display, a first audio source and a second audio source; said display for displaying information to the user and said display comprising a plurality of orientations for displaying information;*

*a second housing, said second housing having a second scroll dial, and a keypad;*

*a hinge for connecting said first housing to the second housing, said hinge allowing the first housing to rotate to place the electronic device in an open position, the first housing being rotatable about an axis directed out of a plane defined by a surface of the display; said hinge further having a cam feature and a locking feature; and*

*a processor for determining position of the electronic device and said processor for controlling functionalities of the electronic device, said first audio source and second audio source based the position of the electronic device.*

*31. The electronic device as claimed in claim 30, wherein said first housing further comprising a first answer key, a first end key and a plurality of first info keys;*

*said second housing further comprising a second answer key, a second end key and a plurality of second info keys;*

*said first audio source comprises a first microphone and first speaker; and*

*said second audio source comprises a second microphone and second speaker.*

*32. The electronic device as claimed in claim 31, wherein said processor is for deactivating said first answer key, said first end key, said plurality of first info keys, said second microphone and said first speaker if it is determined that the electronic device is in an open position; and*

*said processor is for activating said second answer key, said second end key, said plurality of second info keys, said first microphone and said second speaker if it is determined that the electronic device is in an open position.*

*33. The electronic device as claimed in claim 31, wherein said processor is for deactivating said second answer key, said second end key, said plurality of second info keys, said first microphone and said second speaker if it is determined that the electronic device is in a closed position; and*

*said processor is for activating said first answer key, said first end key, said plurality of first info keys, said second microphone and said first speaker if it is determined that the electronic device is in a closed position.*

*34. The electronic device as claimed in claim 30, wherein said first housing further comprises a first camera; and said processor is for deactivating the first camera if it is determined that the electronic device is in a closed position.*

*35. The electronic device as claimed in claim 30, wherein said second housing further comprises a second camera.*

*36. The electronic device as claimed in claim 30, wherein the display has a first orientation wherein the first orientation is provided when the electronic device is in a closed position.*

*37. The electronic device as claimed in claim 30, wherein the display has a second orientation wherein the second orientation is provided when the electronic device is in an open position.*

*38. The electronic device as claimed in claim 30, further comprising a switch connected to said processor wherein said processor rotating said orientation of said display upon actuation of said switch.*

*39. The electronic device as claimed in claim 38, wherein said switch comprises a magnetic switch and said magnetic switch is actuated upon said first housing rotating more than 90 degrees about said second housing.*

*40. The electronic device as claimed in claim 30, wherein said display comprises a first orientation and a second orientation for displaying information to the user, wherein the information is displayed for said first orientation is 180 degrees opposite of the said second orientation.*

*41. The electronic device as claimed in claim 40, wherein said first housing is on top of said second housing such that when the electronic device is in a closed position, said first housing covers said keypad of said second housing and said display displays information using said first orientation.*

*42. The electronic device as claimed in claim 40, wherein said first housing is on top of said second housing such that when the electronic device is in an open position, said first housing exposes said keypad of said second housing and said display displays information using said second orientation.*

*43. An electronic device operable in a wireless communication system having an open position and closed position, the electronic device comprising:*

*a first housing, said first housing comprising a first scroll dial, a display, a first audio source and a second audio source; said display for displaying information to the user and said display having a plurality of orientations;*

*a second housing, said second housing having a second scroll dial, and a keypad;*

*a hinge for connecting said first housing to the second housing, said hinge allowing the first housing to rotate 180 degrees in either direction about said second housing to place the electronic device in an open position, the first housing being rotatable about an axis directed out a plane defined by a surface of the display;*

*a processor for determining position of the electronic device and said processor for controlling functionalities of the electronic device upon determining the position of the electronic device; said processor adjusting the functionalities of said first audio source and second audio source based on the position of the electronic device; and*

*a switch connected to said processor and said processor rotating said orientation of said display upon actuation of said switch.*

*44. The electronic device as claimed in claim 43, wherein said switch comprises a magnetic switch and said magnetic switch is actuated upon said first housing rotating more than 90 degrees about said second housing.*

*45. The electronic device as claimed in claim 43, wherein said first housing further comprising a first camera; and said processor for deactivating the first camera if it is determined that the electronic device is in a closed position.*

*46. The electronic device as claimed in claim 43, wherein said second housing further comprises a second camera.*

*47. The electronic device as claimed in claim 43, wherein the display has a first orientation wherein the first orientation is provided when the electronic device is in a closed position.*

*48. The electronic device as claimed in claim 43, wherein the display has a second orientation wherein the second orientation is provided when the electronic device is in an open position.*

*49. The electronic device as claimed in claim 43, further comprising a switch connected to said processor wherein said processor rotating said orientation of said display upon actuation of said switch.*

*50. The electronic device as claimed in claim 43, wherein said display comprises a first orientation and a second orientation for displaying information to the user, wherein the information is displayed for said first orientation is 180 degrees opposite of the said second orientation.*

*51. The electronic device as claimed in claim 50, wherein said first housing is on top of said second housing such that when the electronic device is in a closed position, said first housing covers said keypad of said second housing and said display displays information using said first orientation.*

*52. The electronic device as claimed in claim 50, wherein said first housing is on top of said second housing such that when the electronic device is in an open position, said first housing exposes said keypad of said second housing and said display displays information using said second orientation.*

*53. A method of controlling functionalities of an electronic device having a first housing and a second housing wherein said first housing is rotatable about the second housing, the method comprising acts of:*

*determining if a switch that provides an indication of rotation of the first housing about the second housing was actuated;*

*switching the orientation of image displayed on a display if determined that a switch is actuated;*

*determining if the electronic device is in a closed position;*

*adjusting functionalities of at least one audio source if determined that the electronic device is in said closed position; and*

*disabling functionality of a first scroll dial if determined that the electronic device is in an open position.*

*54. The method as claimed in claim 53, further comprises an act of determining if the electronic device is in said open position and adjusting the functionalities of at least one audio source if determined that the electronic device is in said open position.*

*55. The method as claimed in claim 53, the method further comprises an act of adjusting functionalities of a first audio source if it is determined that the electronic device is in said closed position.*

*56. The method as claimed in claim 53, the method further comprises an act of adjusting functionalities of a second audio source if it is determined that the electronic device is in said closed position.*

*57. The method as claimed in claim 53, wherein the step of adjusting functionalities comprises a step of disabling a speaker of a second audio source and enabling a microphone of said second audio source.*

*58. The method as claimed in claim 53, wherein the step of adjusting functionalities comprises a step of disabling a microphone of a first audio source and enabling a speaker of said first audio source.*

*59. The electronic device as claimed in claim 30, wherein the first audio source comprises speaker functionality and microphone functionality and the second audio source comprises speaker functionality and microphone functionality and the processor is configured to cause the device to:*

*respond to a determination that the first housing and the second housing are in an open position by deactivating speaker functionality of the first audio source and deac-*

*tivating microphone functionality of the second audio source, and by activating microphone functionality of the first audio source and activating speaker functionality of the second audio source; and*

*respond to a determination that the first housing and the second housing are in a closed position by deactivating microphone functionality of the first audio source and deactivating speaker functionality of the second audio source, and by activating speaker functionality of the first audio source and activating microphone functionality of the second audio source.*

*60. The electronic device as claimed in claim 43, wherein the first audio source comprises speaker functionality and microphone functionality and the second audio source comprises speaker functionality and microphone functionality and the processor is configured to cause the device to:*

*respond to a determination that the first housing and the second housing are in an open position by deactivating speaker functionality of the first audio source and deactivating microphone functionality of the second audio source, and by activating microphone functionality of the first audio source and activating speaker functionality of the second audio source; and*

*respond to a determination that the first housing and the second housing are in a closed position by deactivating microphone functionality of the first audio source and deactivating speaker functionality of the second audio source, and by activating speaker functionality of the first audio source and activating microphone functionality of the second audio source.*

*61. The method as claimed in claim 53, wherein the first housing comprises a first audio source and a second audio source and the first audio source comprises speaker functionality and microphone functionality and the second audio source comprises speaker functionality and microphone functionality, the method further comprising:*

*responding to a determination that the first housing and the second housing are in an open position by deactivating speaker functionality of the first audio source and deactivating microphone functionality of the second audio source, and by activating microphone functionality of the first audio source and activating speaker functionality of the second audio source; and*

*responding to a determination that the first housing and the second housing are in a closed position by deactivating microphone functionality of the first audio source and deactivating speaker functionality of the second audio source, and by activating speaker functionality of the first audio source and activating microphone functionality of the second audio source.*

* * * * *